United States Patent [19]
Matthews

[11] 3,820,420
[45] June 28, 1974

[54] CUTTING BLADES FOR CABLES AND METHOD THEREFOR

[75] Inventor: James J. Matthews, East Haddam, Conn.

[73] Assignee: Utility Tool Corp., East Haddam, Conn.

[22] Filed: Mar. 28, 1973

[21] Appl. No.: 345,776

Related U.S. Application Data
[63] Continuation of Ser. No. 114,778, Feb. 12, 1971, abandoned.

[52] U.S. Cl............... 81/9.5 R, 82/46, 29/97, 30/91.2
[51] Int. Cl............................................. H02g 1/12
[58] Field of Search............ 81/9.5 R, 9.5 A, 9.5 B, 81/9.5 C; 30/91.1, 91.2; 82/46, 47, 53; 29/97

[56] References Cited
UNITED STATES PATENTS

| | | | |
|---|---|---|---|
| 2,462,707 | 2/1949 | Allen | 29/97 X |
| 2,641,944 | 6/1953 | Laffoon | 82/35 X |
| 3,204,495 | 9/1965 | Matthews | 81/9.5 R |

*Primary Examiner*—Leonidas Vlachos
*Attorney, Agent, or Firm*—DeLio and Montgomery

[57] ABSTRACT

Cutting blades for severing covering material from electric cables and the like in which the blades have two cutting elements forming an intersection at which the covering material is severed, the blades include a cutting edge and a surface to lift the covering material from the cable and cutting edge and surface to cut the covering material substantially axially with the covering material being severed at the intersection.

10 Claims, 19 Drawing Figures

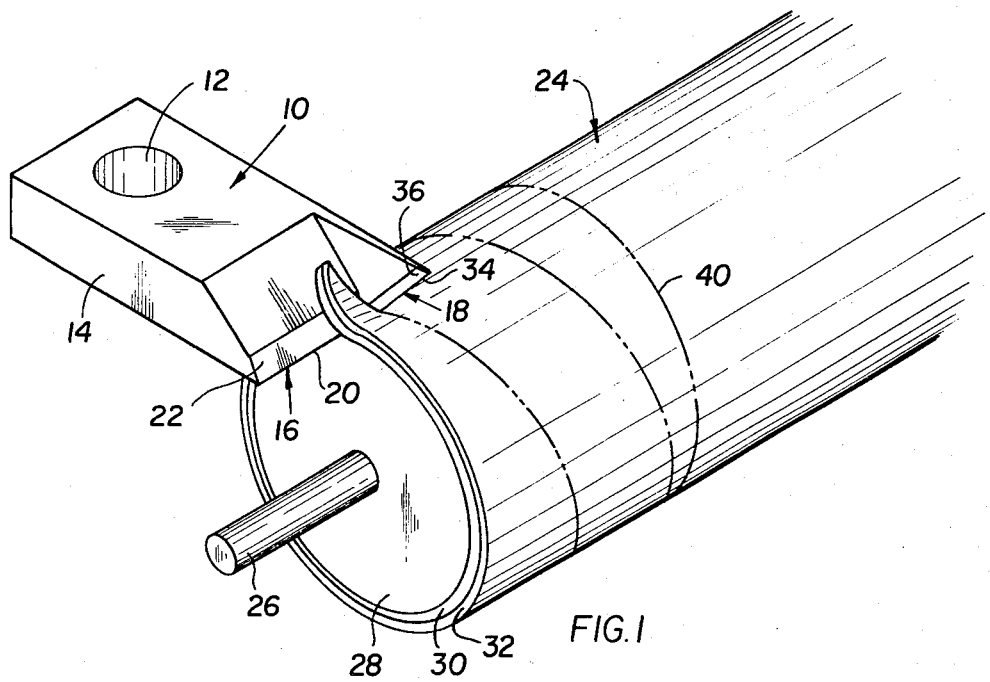
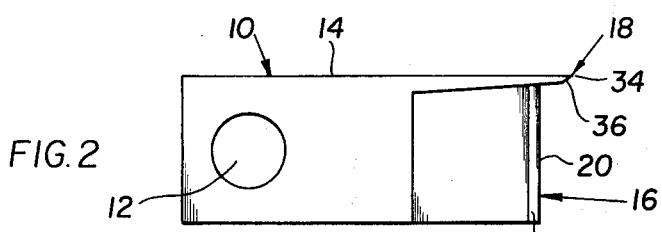
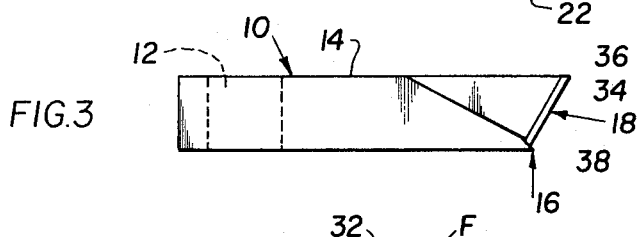
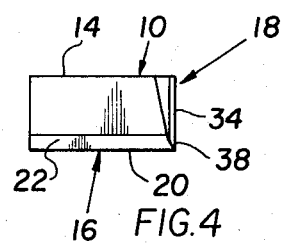
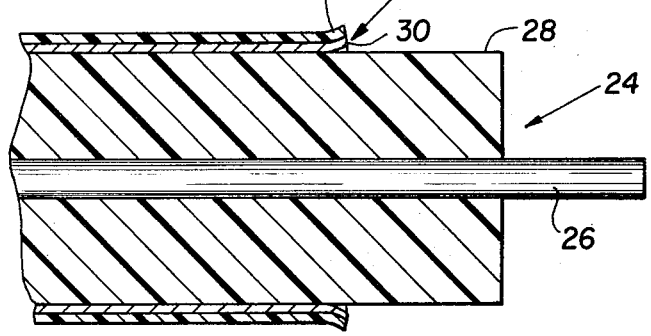

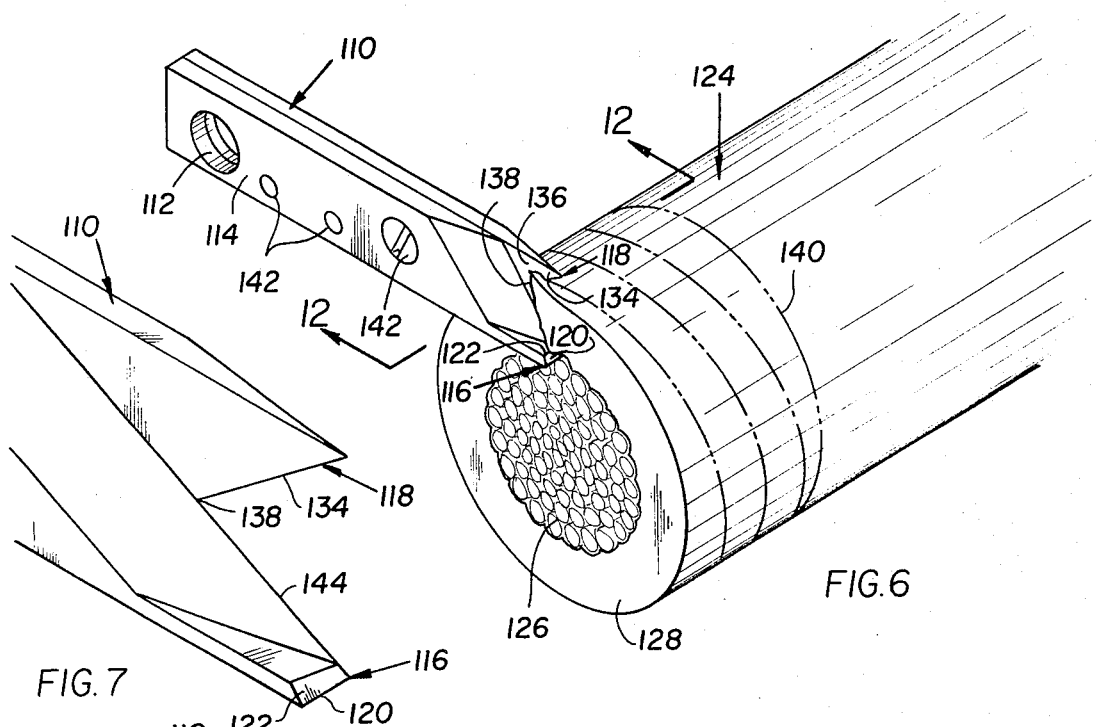
FIG. 6
FIG. 7
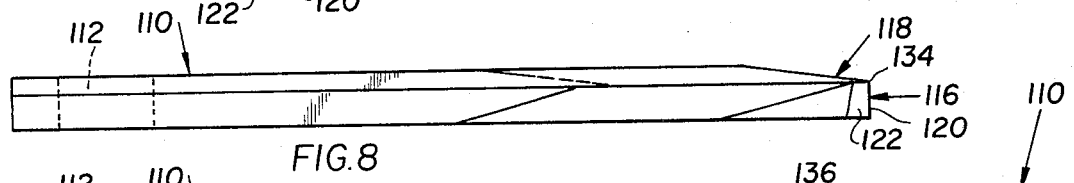
FIG. 8
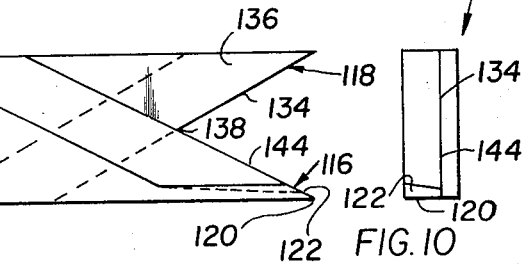
FIG. 9  FIG. 10
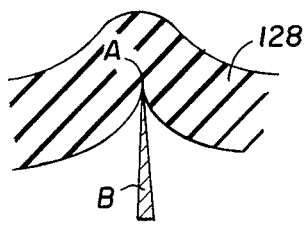
FIG. 11
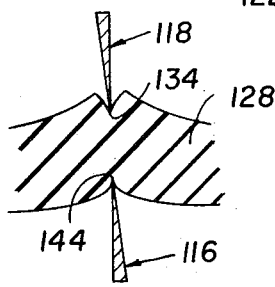
FIG. 12
INVENTOR.
JAMES J. MATTHEWS
ATTORNEYS

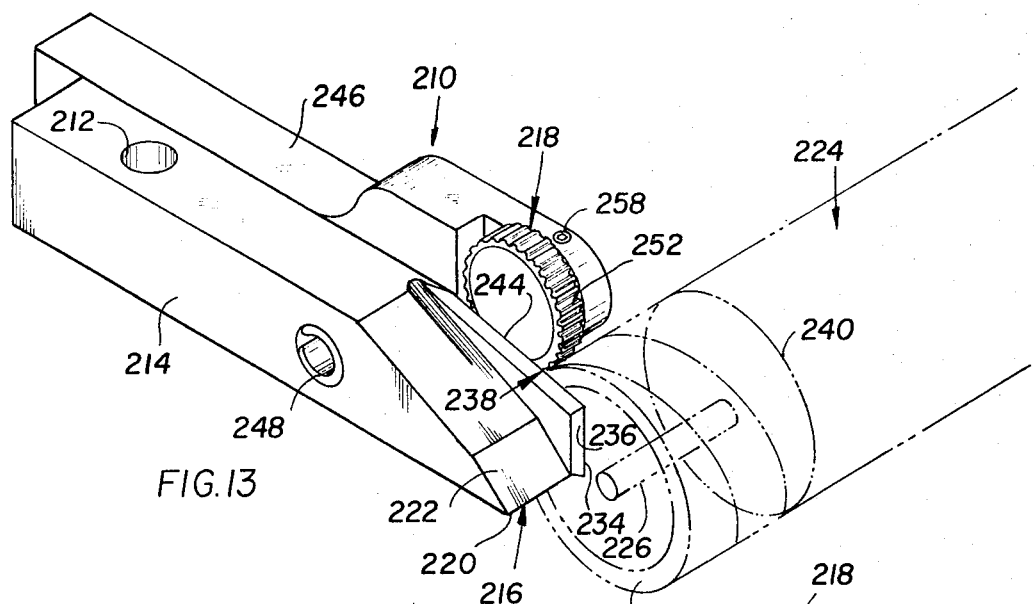
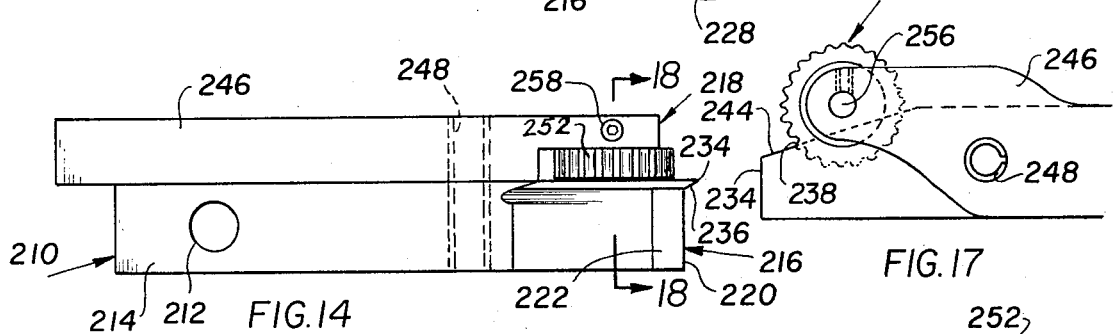
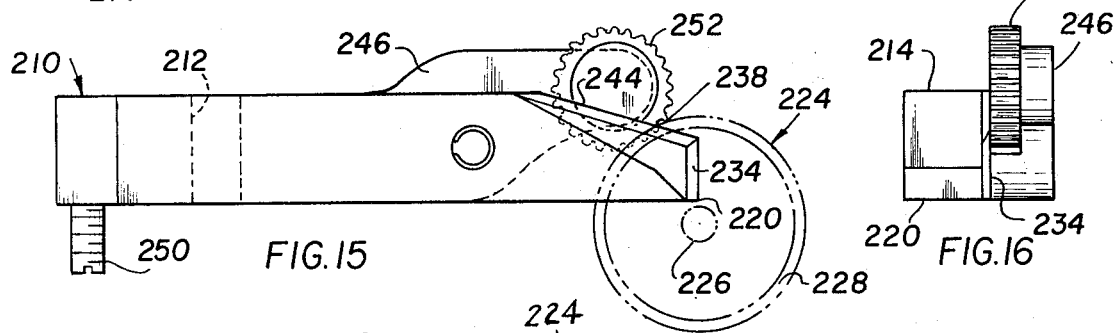
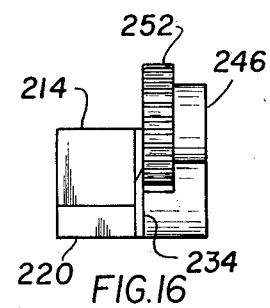
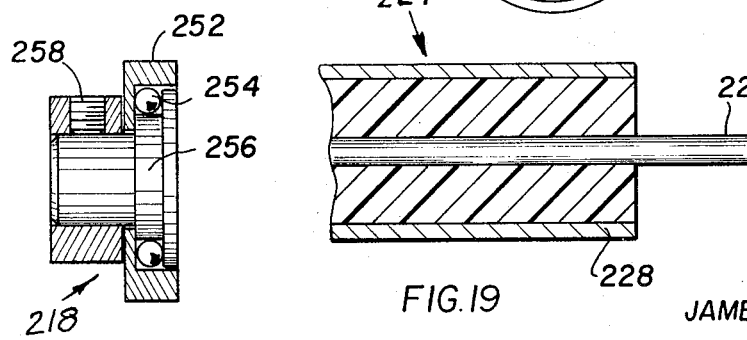
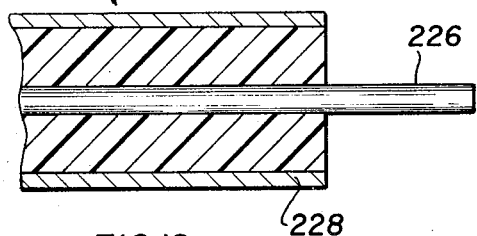

CUTTING BLADES FOR CABLES AND METHOD THEREFOR

This is a continuation of application Ser. No. 114,778 filed Feb. 12, 1971, and now abandoned.

The present invention relates to cutting blades for cutting and stripping coverings from electric cables and the like and to the method for performing the same.

There have been many tools and apparatuses devoted to the problems of stripping and removing of insulation coverings from heavy electrical wire and cable. These problems have been described in my own United States Letters Patent Nos. 3,204,495, 3,398,610, 3,433,106 and others. Such patents are pertinent to the present invention insofar as they serve as a background of the problems to be overcome by the present invention. More particularly in my U.S. Pat. No. 3,398,610, I disclosed the use of an unusually simple but most effective cutting blade for stripping cable insulation without damage and without affecting the integrity of the cable. The present invention relates to improvements in such cutting blade and enables the present cutting blades to be used with tools and apparatuses of my aforementioned patents.

In the process of cutting and severing covering materials from cables, problems are encountered because each cable may be constructed with a different insulative covering material which may or may not include an electrical shield. In some cables which do include an electrical shield, it may be necessary to finish the severing of the insulative covering material from the cable by producing a flare on the end of the covering material remaining on the cable. This final preparation of the remaining covering material may be conveniently used to join a connector to the bared cable and permit the insertion of the sleeve beneath the flared end for quick and easy electrical connection. Thus, the present cutting blade may be utilized not just to cut and sever a desired length of insulative covering material from a cable, but also to prepare the remaining covering material for another function or subsequent use.

Similarly and because of the differences in insulated coverings used, it is sometimes difficult to smoothly cut and cleanly sever soft yielding flexible coverings without producing ragged or torn edges and ends that may materially affect tthe characteristics of the cable. In this connection, the present invention takes advantage of the pliant nature of the covering material by severing the covering material between two cutting elements. By so severing the insulating covering material between two cutting elements, it is possible to treat electrical cables without regard to their size or nature of the covering materials utilized.

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein:

FIG. 1 is a perspective view of a cutting blade constructed according to the teaching of the invention;

FIG. 2 is a top view of the blade;

FIG. 3 is a side elevational view;

FIG. 4 is an end view;

FIG. 5 is a cross-section of the finished end of a cable treated according to the teaching of the invention;

FIG. 6 is a perspective view of a modified cutting blade;

FIG. 7 is an enlarged perspective view of the cutting elements;

FIG. 8 is a top view;

FIG. 9 is a side elevational view;

FIG. 10 is an end view;

FIG. 11 graphically illustrates the use of a single cutting element according to the prior art;

FIG. 12 is a graphic illustration of the use of the present invention taken along lines 12—12 of FIG. 6;

FIG. 13 is a perspective view of still a further modified cutting blade;

FIG. 14 is a top view of FIG. 13;

FIG. 15 is a side elevational view;

FIG. 16 is an end view;

FIG. 17 is an elevational view of the cutting blade of FIG. 13 taken from a side opposite that shown in FIG. 15;

FIG. 18 is a cross-section of FIG. 14 taken along lines 18—18; and

FIG. 19 is a cross-section of the end of a cable treated in accordance with the embodiment of the cutting blade shown in FIGS. 13 to 18 inclusive.

Referring now to the drawings and more particularly to FIGS. 1 to 5 inclusive, the cutting blade thereshown is generally identified by the numeral 10. As the description proceeds, it will become clear that the cutting blade 10 may be utilized substantially in the same manner as the cutting element 34 disclosed in my United States Letters Patent No. 3,398,610, the precise nature of the tool with which the blade is employed being immaterial in the present disclosure. The present cutting blade 10 is provided with a mounting hole or opening 12 to enable the same to be mounted to any convenient tool much in the same manner as is noted in my prior patent.

The blade 10 comprises a body 14 which is substantially rectangular in cross-section and has a plurality of intersecting cutting elements generally identified by the numerals 16 and 18. The cutting element 16 includes a sharp cutting edge 20 which is directed substantially tangentially and terminates a tangentially disposed material lifting surface 22. The lifting surface 22 is disposed on the body 14 at an angle to a plane (not shown) extending horizontally substantially through the central axis of the cable. The cable illustrated in FIG. 1 is identified in a general manner by the numeral 24. As in prior described cables, the same comprises a central core 26 about which there is located a large insulating body 28 covered by an electrical grounding shield 30 having an outer insulating covering 32, all or any part of which will be referred to hereinafter for convenience as covering material.

When it is desired to remove a part or portion of the covering material which may include the shield 30, the present cutting blade 10 may be utilized. The cutting element 18 includes an axially directed cutting edge 34 which terminates a substantially axially movable surface 36. The edge 34 is directed at an angle to a vertical plane (not shown) that may extend through the central axis of the cable 24 and slopes downward and rearward from the direction of the vertical plane into an intersecting relationship with the lift surface 22. The point of intersection is more clearly illustrated in FIG. 3 by the numeral 38.

In the present embodiment of the cutting blade 10, the upper portion of the cutting edge 34 projects forward and in advance of the intersection 38 and well in advance of the tangential cutting edge 20. Hence, in use, the cutting edge 34 will be in a position to precede the tangential cutting edge 20.

In operation, the cutting blade 10 may be utilized with a tool similar to that disclosed in my U.S. Pat. No. 3,398,610. The blade 10 is angled in the direction of the axis of the cable 24 on the tool much in the same manner as disclosed in my aforementioned patent such that the same describes a helical path in the rotation of the tool about the cable 24. This path is illustrated in FIG. 1 by broken lines. Initially, the blade 10 is set on the tool such that the cutting edge 20 will penetrate the covering material of the cable to a desired depth. During the rotation of the tool relative to the cable 24, the cutting edge 20 will cut into the covering material of the cable to the predetermined depth while at substantially the same time the cutting element 18 will also penetrate the covering material at its cutting edge 34.

As the tool rotates about the cable 24, it is caused to follow the helical path thereshown. The edge 20 of the blade 10 penetrates the covering material to the desired depth and the covering material so cut is caused to ride up and lift free of the remainder of the covering material 28 by the substantially tangentially disposed lifting surface 22. The substantially simultaneous cutting in an axial or helical direction by the edge 34 causes the cut covering material to ride along the substantially axially directed surface 28 and moved axially away from the uncut portion of the cable. The angular intersection of the cutting edge 34 with the lifting surface 22 causes the cut material to be directed toward the intersection 38.

The downward rearward sloping angular position of the cutting edge 34 tends to force the covering material downward against the lift surface 22 to assure that the same will be directed toward the point of intersection 38 at which the covering material is then completely severed from the remaining covering material of the cable 24. In the present illustration of FIG. 1, the depth of cut is shown to be to the extent of the thickness of the outer insulating covering 32 and the insulating shield 30. When it is desired to terminate the axial length of the cut, the tool on which the blade 10 is mounted is simply rotated circumferentially about the cable but held from further helical feeding along the axial length of the cable. This results in a complete peripheral ringing cut illustrated by the broken line 40 resulting in the removal of the now severed covering material from the remainder of the cable.

In making the final ringing cut, the downwardly sloping angle of the cutting edge 34 toward the intersection 38 presses the cut insulative covering material against the lift surface 22. Since the intersection 38 of the lift surface 22 with the axial cutting edge 34 is positioned rearward or behind the tangential cutting edge 20, the covering material on the cable is caused to rise to the height of the intersection 38. Thus, there is a delayed cutting action at the intersection 38 as compared to the cutting action occurring at the cutting edge 20, which results in a slight outward flaring of the electrical shield 30 and insulating covering 32 as shown in FIG. 5.

It will be recognized by those skilled in the art that by varying the relative position of the intersection 38 with respect to the cutting edge 20, the resultant flare of the covering material here composed of the shield 30 and cover 32 and indicated by the letter F in FIG. 5 can be varied to accommodate different sized electrical connectors that are adapted to be engaged over the remaining surface 28 of the cable 24. Therefore, in addition to being able to remove covering material to a preselected depth and axial length of the cable 24, it is also possible by the present invention to prepare the remaining covering material of the cable for a subsequent beneficial use and function.

Referring now to the embodiment of the invention disclosed in FIGS. 6 to 12 inclusive, the relationship of the disclosure will become more readily apparent and an elimination of duplication of description of elements and functions may be accomplished by identifying like details of structure by numerals employed in connection with the embodiment shown in FIGS. 1 to 5. In this connection, structure identified in the embodiment of FIGS. 6 to 12 inclusive will be numbered in the 100 series with the tens digits corresponding to like numerals identifying like details of structure of the embodiment 10.

The embodiment 110 of FIGS. 6 to 12 illustrates a cutting blade having a mounting hole 112. The blade 110 may be formed in one or more parts. For convenience of manufacture and illustration, the blade 110 has been shown in two parts with the portions thereof conveniently secured together by a plurality of screws or rivets 142. The first cutting element 116 includes a substantially tangential cutting edge 120 terminating a lifting surface 122 while the second intersecting cutting element 118 has a substantially axially directed cutting edge 134 which terminates a substantially axially moving surface 136. The two cutting elements 116 and 118 have a point of intersection 138 defined by a further cutting edge 144. In substantially all other respects, the embodiment 110 is substantially the same as the embodiment 10 previously described.

The cable 124 may have an outer insulative covering material 128 that may have been extruded about a central core of electrical wires 126. By properly mounting the cutting blade 110 on a tool such as that disclosed in my aforementioned patent, the depth of penetration of the tangential cutting edge 120 may be predetermined such that the same will penetrate the insulative covering material 128 to a point slightly spaced from the core 126 to prevent scratching or damage to such core. The axial cutting edge 134 when initially positioned on the operating tool will be at an angle to the axis of the cable 124, thereby tending to thread itself helically about the insulation of the cable in a manner depicted by the broken lines in FIG. 6.

As in the prior embodiment, the cutting edge 134 slopes angularly downward toward the intersection 138 defined by the two cutting elements 116 and 118, and thus will make a penetrating cut into the insulative covering material 128 in advance of or prior to the approach of the material to the intersection 138. In like manner because the intersection 138 trails or is behind the tangential cutting edge 120, the cutting edge 120 will penetrate the insulative covering material 128 prior to the material reaching the intersection 138 at which point the material is completely severed from the cable 124.

Provided on the first cutting element 116 is the further cutting edge 144 which functions as a continuation of the axially directed cutting edge 134. However, because both cutting edges 134 and 144 are directed angularly toward each other and intersect at 138 to define the intersection of their respective cutting elements, each such cutting edge functions as a means to direct the insulating material 128 toward the severing intersection 138. The intersecting angularly directed cutting edges 134 and 144 function to initially cut the covering material 128 and to direct the same between them so that when the covering material is of a soft, elastic composition as rubber, the covering material is prevented from flowing away from the cutting edges.

Perhaps this can be best exemplified by the illustration in FIG. 11 wherein the use of a single cutting blade B engages and is pressed against the surface of a soft pliable flexible covering material 128. There will be noted that the covering material 128, if of a rubber-like composition, has a natural tendency to flow around the sides of the blade pressed against it in the manner as illustrated in FIG. 11. As the covering material 128 flows and folds around the blade, a resistance is created by the engagement of the covering material on both sides of the blade which creates a frictional drag and resistance and resists the cutting action.

However, by the present invention and the method of cutting and severing such covering material 128, the natural tendency of the covering material to flow and fold around the blade is overcome and the natural resistance created by such covering material 128 is taken advantage of to produce a beneficial result. For example, in FIG. 11 the covering material resists the cutting action at point A of the blade B and were the blade B inclined in the manner of either the edge 134 or 144, the material 128 would ride down or up the same without being cleanly cut, but rather would be torn by virtue of the great forces applied to the blade B to tear through the covering material 128.

By intersecting the two cutting elements 116 and 118 in the manner according to the present invention whereby they intersect at the very point of expansion of the covering material, the stretch or expansion of such covering material is taken advantage of. This can be best illustrated in FIG. 12 wherein the covering material 128 is trapped between converging cutting edges 134 and 144 of the respective cutting elements 116 and 118. The tendency of the covering material to expand is taken advantage of by directing the covering material 128 toward the point of intersection 138. Because of the tension created in the soft covering material 128 at the point of intersection 138, it takes less force to cleanly and smoothly sever the covering material at the intersection.

Hence, it can be seen that by directing the soft pliant covering material toward the intersection and by taking advantage of the natural tendency of the covering material to stretch and tense, the severing action accomplished at the point of intersection 138 is quick, smooth and clean, leaving no ragged edges. This clean severance is aided by the action of the cutting edges 134 and 144 with direct the flow of the material 128 to the point of intersection.

Referring now to the embodiment disclosed in FIGS. 13 to 18 inclusive, the description thereof will be related to the prior embodiments 10 and 110 by utilizing identifying numerals in the 200 series. The tens digits of the numerals shall be the same as those utilized in the description of the embodiments 10 and 110 with corresponding parts identified by like numerals.

The embodiment 210 utilizes a pair of intersecting cutting elements generally identified by the numerals 216 and 218. The cutting element 216 is formed as a part of a body 214 that may have a top mounting hole 212 to enable the blade 210 to be conveniently mounted in fixed position on a tool such as that disclosed in my U.S. Pat. No. 3,398,610. In the present disclosure, the blade 210 is formed in two parts in which a second scissoring member 246 may be mounted to the body 214 at a pivot 248. An adjustment screw 250 may be mounted in the tool to limit the pivoting of the member 246 relative to the body 214 as shown schematically in FIG. 15. Thus, the upward movement of the member at the cable may be predetermined by the adjustment of the screw 250.

The first cutting element 216 is provided with a tangential lift surface 222 which terminates in a tangential cutting edge 220. The lift surface 222, as in the prior described embodiments, is at an angle to a horizontal plane extending through the center of the cable 224 so that when the insulating covering material of the cable is cut by the edge 220, the cut material is caused to be lifted from the cable as it rides upwardly along the surface 222.

Substantially perpendicularly disposed with respect to the cutting edge 220 is an axial cutting edge 234 which terminates an axial moving surface 236. Unlike the prior described embodiments, the edge and related surface 234 and 236, respectively, form a part of the first cutting element 216. It will be noted that the edge 234 precedes or is an advance of the edge 220 so that when the cutting blade is brought into contact with the covering material 228 of the cable 224, the edge 234 makes an initial cut into the insulating material. Because of this, the cutting edge 234 and its related surface 236 are positioned substantially parallel to a plane extending vertically along the axis of the cable 224.

The cutting edge 234 merges with a further axially directed cutting edge 244 that terminates a continuation of the surface 236. The edge 244 slopes downward at an angle to a horizontal plane extending through the central axis of the cable. It is this cutting edge 244 which cooperates with the cutting element 218 to form the intersection 238 at which the covering material 228 is completely severed from the remainder of the insulating covering material of the cable 224.

With the cutting blade 210 mounted on a cutting tool in the manner previously referred to, the depth of cut of the tangential edge 220 is preset in the tool. As the tool approaches the cable at an angle directed axially toward the cable, the cutting edge 234 tends to cut into the covering material following a helical path illustrated by the broken lines in FIG. 13. Substantially simultaneously, the tangential cutting edge 220 cuts into the insulating covering material 228 to the depth of its presetting on the tool. During the rotation of the tool about the cable, the cutting blade 210 follows the helical path described with the cut covering material being lifted at the surface 222 and being axially moved away from the remainder of the cable covering at the surface 236.

However, the final severing of the covering material is accomplished at the intersection 238 between the cutting elements 216 and 218 by the further cutting edge 244 directing the covering material 228 toward such intersection. The directing of the covering material is further aided by the rolling action of a cutting wheel 252 being pivotably limited by preset screw 250 in its scissoring relationship with the edge 244 at the intersection 238. In this manner, the covering material 228 is guided and directed toward the intersection 238 where it is finally severed from the remainder of the cable covering when the further helical axial movement of the tool is terminated and the final ringing peripheral rotation of the tool about the cable is accomplished along the line 240.

The roller 252 comprises a sharp edged element bearingly mounted at 254 on a support pin 256 that may be held in position on the member 246 by a set screw 258 as illustrated in FIG. 18. The roller surface may be toothed or roughened to cause it to roll more readily over the covering material to prevent the same from distorting out of shape.

The present embodiment of the blade 210 is unusually well adapted for severing from cables those jackets having electrical shields and external dielectric coverings. Although such combinations of shield and jacket is not shown in the present embodiment, the same is illustrated in FIG. 1 at 30 and 32. In the present embodiment, as the blade 210 is advanced around the cable in the helical path described, there is a natural tendency upon the part of the cut covering material 228 to lift free of the cable and, thereby, result in a ragged cutting edge which may materially affect the current carrying characteristics of the cable. However, during the cutting action described, the broad surface of the wheel 252 is in constant touching and surface rolling engagement with the outer surface of the covering 228 preventing such covering from responding to its natural lifting tendency. When the wheel 252 is provided with a knurled or serrated surface, it will grasp and rotate more readily over the covering material and press against the same to prevent it from flaring.

Tangential pressure is exerted against the wheel 252 causing it to turn and ride over the surface of the covering material 228 which, in cooperation with the cutting edge 244, produces a shearing action at the intersection 238. As a consequence, the shearing and cutting is cleanly defined and smooth, and the resultant stripped cable evidences no deformation either of the outer insulative dielectric covering or the metallic shield therebeneath.

This is important since any depression in the insulative covering material such as might result from the use of presently known cutting devices will materially affect and change the electrical current carrying characteristics of the cable. It is further important to prevent a flaring of the edge of the covering material 228 remaining on the cable 224. The tangential rolling action and shearing movement accomplished between the flat surfaced roller 252 and the cooperating cutting edge 244 eliminates all such deleterious possibilities from occurring.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A cutting blade for severing covering material from an electrical cable comprising a first cutting element having a lifting surface terminating in a substantially tangentially directed cutting edge with respect to the cable to be operated upon, a second cutting edge on said element terminating in a plane substantially perpendicular to the plane in which said first cutting edge resides, said second cutting edge defining an acute angle with the plane in which said first cutting edge resides and means cooperating with said second cutting edge and forming a severing intersection therewith.

2. The cutting blade of claim 1 wherein said cooperating means is a roller adapted to ride on the periphery of the cable.

3. The cutting blade of claim 2 further including a second element pivoted for movement relative to said first element and supporting said roller thereto for rotating movement relative to said second cutting edge.

4. A device for removing covering material from an electrical cable comprising first and second cutting elements having an intersection at which the covering material is engaged to sever material from the remaining material, each of said element having surfaces terminating in cutting edges, said first element having a first surface terminating in a first cutting edge, said second element having a second surface terminating in a second cutting edge, said first cutting edge being constructed to move substantially tangentially with respect to said cable to cut a radial thickness of material therefrom, said second cutting edge being disposed to cut said thickness from the remainder of the material, said second edge extending at an acute angle upwardly and outwardly from said first edge at one end of said first edge, whereby as said blade is moved tangentially about said cable said first surface lifts a radial thickness of material from said cable as said second edge cuts downwardly on said radial thickness and severs it from the remaining material.

5. A device for removing covering material from an electrical cable comprising first and second cutting elements having an intersection at which the covering material is engaged to sever material from the remaining material, said first element having a first surface terminating in a first cutting edge, said first cutting edge being constructed to move substantially tangentially with respect to said cable to cut a radial thickness of material therefrom, said first element having a second surface terminating in a second cutting edge, said second element including a rotatable member adapted to roll on the periphery of said material, said second cutting edge forming an intersection with said rotatable member whereby as said device is moved tangentially about said cable said first surface lifts a radial thickness of material from said cable as said second edge cooperates with said roller to cut said radial thickness from the remaining material.

6. A device for stripping material from a conductive cable comprising means defining first and second cutting edges disposed in substantially perpendicular planes, said edges adapted to be directed into said cable a predetermined distance at an angle and along a path exclusive of the axis of said cable while being rotated about said cable so the first of said edges cuts inwardly of said cable toward the axis thereof a predetermined depth while said second edge lifts the material of said depth from the cable, and a third edge extending from said second edge to said first edge and residing in substantially the same plane as said first edge and defining an acute angle with said first edge.

7. A device for cutting covering material from a conductive cable comprising a member defining first and second cutting edges disposed in substantially perpendicular planes, said edges adapted to be directed into said cable a predetermined distance at an angle and along a path exclusive of the axis of said cable while being rotated about said cable so that one of said edges cuts substantially radially outwardly of said cable while said other edge lifts the material of said cut from the cable, and a roller adapted to engage the outer periphery of said cable adjacent said one edge and roll on the periphery of said cable, said roller acting to press down on said cable as said one edge cuts outwardly through the cable covering material.

8. The device of claim 7 wherein said roller is rotatably carried on a second member, said second member being pivotally mounted to said first member.

9. The device of claim 7 wherein said roller has a knurled periphery.

10. The device of claim 7 wherein said roller has a sharp edge adjacent said one edge.

* * * * *

PO-1050
(5/69)

UNITED STATES PATENT OFFICE
CERTIFICATE OF CORRECTION

Patent No. __3,820,420__ Dated __June 28, 1974__

Inventor(s) __James J. Matthews__

It is certified that error appears in the above-identified patent and that said Letters Patent are hereby corrected as shown below:

Column 1, line 14, after "others." insert --said U. S. Letters Patent 3,204,495 discloses an insulation removing tool including a fixture which is clamped about an electrical cable and includes an insulation cutting or stripping tool. When the fixture is rotated about the cable the cutting tool will cut and strip insulation therefrom a predetermined radial depth or thickness from the outer periphery of the cable.--

Column 1, line 46, after "affect", "tthe" should read --the--.

Column 2, line 48, after "axis of the cable" insert --(as the cable is exemplified in Fig. 1)--.

Column 2, line 60, after "terminates" insert --at--.

Column 2, lines 63 and 64, cancel "cable 24 and slopes downward and rearward from the direction" and insert in place thereof --cable 24 perpendicular thereto. Edge 34 slopes downward and rearward from the direction--.

Column 3, lines 2 and 3, cancel "forward" and insert in place thereof --forwardly, upwardly from,--.

Column 3, line 9, after "angled" delete --in the direction of-- and insert "toward" in place thereof.

Column 3, line 31, after "causes the" insert --tangentially-

Column 3, line 32, change "28" to --36--.

Column 3, line 61, after "intersection 38" insert

UNITED STATES PATENT OFFICE
CERTIFICATE OF CORRECTION

U. S. Patent No. 3,820,420 (continued)

--The term axial cutting edge as used herein refers to an edge which severs material from the cable in a plane which passes transversely through the axis of the cable.--

Column 4, line 21, after "tens digits" insert --(10's)--.

Column 5, line 66, after "tens" insert --(10's)--.

Column 6, line 61, delete "being axially".

Column 6, lines 52 and 53, cancel "directed axially toward the cable" and substitute therefor --transverse to the axis thereof--.

Signed and sealed this 15th day of October 1974.

(SEAL)
Attest:

McCOY M. GIBSON JR.
Attesting Officer

C. MARSHALL DANN
Commissioner of Patents